US007349469B1

United States Patent
Touzni et al.

(10) Patent No.: US 7,349,469 B1
(45) Date of Patent: Mar. 25, 2008

(54) DC OFFSET CORRECTION FOR CONSTANT MODULUS EQUALIZATION

(75) Inventors: Azzédine Touzni, Doylestown, PA (US); Thomas J. Endres, Kent, WA (US); Haosong Fu, Levittown, PA (US); Raúl A. Casas, Doylestown, PA (US); Christopher H. Strolle, Fort Washington, PA (US)

(73) Assignee: ATI Research, Inc., Santa Clara, CA (US)

( * ) Notice: Subject to any disclaimer, the term of this patent is extended or adjusted under 35 U.S.C. 154(b) by 1031 days.

(21) Appl. No.: 10/213,854

(22) Filed: Aug. 7, 2002

Related U.S. Application Data

(60) Provisional application No. 60/313,161, filed on Aug. 17, 2001.

(51) Int. Cl.
*H03H 7/30* (2006.01)
(52) U.S. Cl. .................................... 375/232
(58) Field of Classification Search ................ 375/259, 375/260, 229, 230, 233, 232, 231
See application file for complete search history.

(56) References Cited

U.S. PATENT DOCUMENTS

| | | | | |
|---|---|---|---|---|
| 5,777,692 A | * | 7/1998 | Ghosh | 348/725 |
| 5,822,380 A | * | 10/1998 | Bottomley | 375/347 |
| 5,872,815 A | | 2/1999 | Strolle et al. | |
| 5,909,466 A | | 6/1999 | Labat et al. | |
| 6,108,517 A | * | 8/2000 | Arslan et al. | 455/21 |
| 6,314,147 B1 | * | 11/2001 | Liang et al. | 375/346 |
| 6,504,884 B1 | * | 1/2003 | Zvonar | 375/346 |
| 6,650,716 B1 | * | 11/2003 | Ratnarajah | 375/347 |
| 7,058,144 B2 | * | 6/2006 | Baldwin | 375/346 |

OTHER PUBLICATIONS

"The Performance of Staggered Quadrature Amplitude Modulation in the Presence of Phase Jitter" by Richard D. Gitlin and Edmond Y. Ho, IEEE Transactions On Communications, vol. COM-23, No. 3, Mar. 1975, pp. 348-352.
"Timing Recovery In Digital Synchronous Data Recovery" by Kurt H. Mueller and Markus Miller, IEEE Transactions On Communications, vol. Com-24, No. 5, May 1976, pp. 516-531.

(Continued)

*Primary Examiner*—Emmanuel Bayard
(74) *Attorney, Agent, or Firm*—Steve Mendelsohn

(57) ABSTRACT

A single-axis receiver processes, for example, a complex vestigial sideband (VSB) modulated signal with an equalizer accounting for DC offset within the modulated signal. The DC offset embedded in a received signal may degrade the process of equalization. The equalizer includes a method of blind estimation of the DC offset for removing the DC offset. The estimate is generated by jointly minimizing a Constant Modulus (CM) cost function over equalizer parameters and a DC offset estimate. An arbitrary DC offset the CM cost function admits local spurious minima in terms of the equalizer function. If the DC offset at the receiver is equal to the DC offset inserted at the transmitter, which is equivalent to neglecting the ISI caused by the channel, then only half of the CM equalizer minima remain unchanged. Provided a power constraint on the signal space is satisfied, the DC offset estimate, computed with a joint optimization of the CM cost function, converges to the desired solution, and, thus, the equalizer parameters are guaranteed to converge to the desired solution.

53 Claims, 6 Drawing Sheets

OTHER PUBLICATIONS

"Practical Blind Demodulators For High-Order QAM Signals" by John R. Treichler, Michael G. Larimore and Jeffrey C. Harp, Proceedings of the IEEE, vol. 86, No. 10, Oct. 1998, pp. 1907-1926.

"Blind Equalization Using the Constant Modulus Criterion: A Review" by C. Richard Johnson, Jr., et al, Proceedings of the IEEE, vol. 86, No. 10, Oct. 1998, pp. 1927-1950.

"Global Convergence Of A Single-Axis Constant Modulus Algorithm" by A. Shah, S. Biracree, R. A. Casas, T. J. Endres, S. Hulyalkar, T. A. Schaffer and C. H. Strolle, Technical Memo, NxtWave Communications, Langhorne, PA.

"A New Approach to Multipath Correction Of Constant Modulus Signals" by John R. Treichler and Brian G. agee, IEEE Transactions On Acoustics, Speech And Signal Processing, vol. ASSP-31, No. 2, Apr. 1983, pp. 459-471.

"Uniqueness Of The Maximum Likelihood Estimates Of The Parameters Of An ARMA Model" by Karl J. Åström and Torsten Söderström, IEEE Transactions On Automatic Control, Dec. 1974, pp. 769-773.

"Digital Communication," Lee and Messerschmitt, Appendix 17-B, Kluwer Academic Publishers, Norwell, MA, Second Edition, 1994.

"Self-Recovering Equalization and Carrier Tracking in Two-Dimensional Data Communication Systems" by D. N. Godard, IEEE Transactions on Communications, vol. 28, No. 11, pp. 1867-1875, Oct. 1980.

"Blind Deconvolution," by Simon Haykin, Chapter 2, Prentice Hall, Englewood Cliffs, NJ, 1994, pp. 8-59.

"Phase recovery based on minimization of Single-Axis Constant Modulus criterion: Performance analysis" by A. Touzni, et al., 2001 Conference on Information Sciences and Systems, The John Hopkins University, Mar. 21-23, 2001.

"Adaptive Fractionally Spaced Blind Equalization" by I. Fijalkow, F. Lopez de Victoria and C. R. Johnson Jr., 1994 IEEE, pp. 257-260.

* cited by examiner

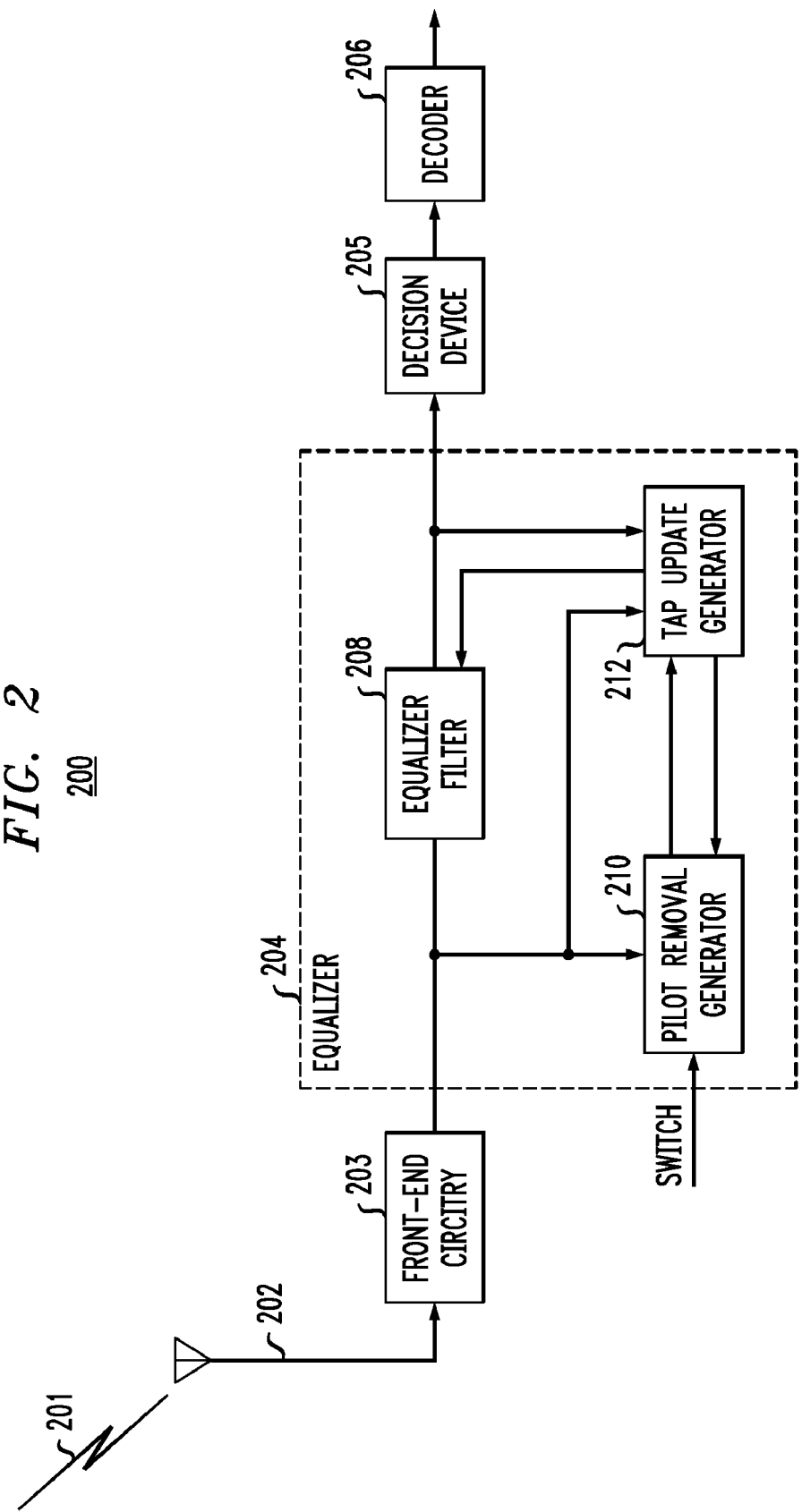

DC OFFSET CORRECTION FOR CONSTANT MODULUS EQUALIZATION

CROSS-REFERENCE TO RELATED APPLICATIONS

This application claims the benefit of the filing date of U.S. provisional application no. 60/313,161, filed on Aug. 17, 2001.

BACKGROUND OF THE INVENTION

1. Field of the Invention

The present invention relates to an equalizer in a receiver of a digital communications system, and more particularly, to blind equalization of modulated data with a DC offset.

2. Description of the Related Art

In many digital communications systems, a source generates digital information for transmission to multiple destination receivers. A transmitter processes the digital information into an encoded (e.g., error-correction encoded) and/or packetized stream of data. The stream of data is then divided into discrete blocks. Each of the blocks is mapped onto a corresponding one of a sequence of code or symbol values ("symbols") chosen from a pre-defined alphabet, and generated with a period $T_s$, sometimes referred to as the "baud" period. Symbols may be modulated by an analog, e.g., radio frequency (RF), carrier, in amplitude, phase, and/or frequency prior to physical transmission through the communication medium. Many methods of mapping exist and are well known in the art, and these pre-defined alphabets are generated based on certain criteria. For example, data may be mapped into symbols of a complex data stream as pairs of in-phase (I) and quadrature phase (Q) component values that are subsequently modulated with an RF carrier.

Various modulation techniques, such as pulse amplitude modulation (PAM), quadrature amplitude modulation (QAM), phase-shift keyed (PSK) modulation, or vestigial sideband (VSB) modulation are known in the art of communications to modulate the carrier. For example, modulation formats such as PAM, QAM, and complex VSB are common formats used for transmission of digital television signals in accordance with, for example, the ATSC standard for digital television, "ATSC Digital Television Standard," September 1995.

For these modulation techniques, a quadrature oscillator may be employed with a complex RF upconverter to form a modulator. The I-component modulates the cosine component generated by the oscillator and the Q-component modulates the sine component of the oscillator. VSB modulation is a form of single-sideband modulation in which the redundant sideband of a real-valued signal is removed in full by filtering, except for a small vestige of the sideband. For VSB modulation, a complex signal is formed with the Q-component being the Hilbert transform of the I-component (however, the Q-component thus contains no additional user information).

A transmitter may also insert a pilot and/or other reference into the modulated carrier signal prior to transmission to aid the receiver in carrier synchronization and recovery. For example, 10 Megabaud terrestrial broadcast of Digital Television (DTV) signals in the United States employs single-carrier, single sideband modulation (known as 8-VSB for 8-level Vestigial Sideband Modulation). A narrowband pilot tone is inserted into the lower band edge of the 8- or 16-VSB data spectrum, containing about 7.5 percent of the power of the data spectrum, to aid in carrier synchronization. Thus, for VSB modulation, the reference signal is applied as a 1.25 DC offset to the VSB constellation. For 8-VSB with a symbol set (±1, ±3, ±5, ±7) and 16 VSB with a symbol set (±1, ±3, ±5, ±7, ±9, ±11, ±13, ±15) the DC offset applied is 1.25. Other references added may include training sequences to aid in equalization by the receiver.

The modulated carrier signal transmitted through the medium (which may be, e.g., terrestrial, cable, underwater, wire, optical fiber, atmosphere, space, etc.) comprises a series of analog pulses, each analog pulse being amplitude and/or phase modulated by a corresponding symbol in the sequence. The pulse shape used typically extends many symbol periods in time. This introduces the possibility of adjacent pulses corrupting each other, a phenomenon known as inter-symbol interference (ISI). Most propagation mediums introduce signal distortion, and factors that cause distortion include added noise (static), signal strength variations (fading), phase shift variations, and multiple path delays. In addition, front-end circuitry of the receiver and transmitter also introduce distortion and noise to the signal. The presence of distortion, noise, fading and multipath introduced by the overall communication channel (transmitter, receiver and propagation medium) can cause digital systems to degrade or fail completely when the bit error rate exceeds some threshold and overcomes the error tolerance of the system.

A receiver performs several functions to demodulate and decode a received signal. Receiver functions include, for example, tuning and RF demodulation of the received signal to an intermediate frequency (IF) signal, synchronization with the RF carrier, equalization, symbol detection, and decoding.

A complex demodulator translates the received signal from RF to intermediate frequency (IF), and performs complex demodulation of the received signal at IF to near passband employing the locally generated reference for the carrier signal. To perform demodulation, the receiver includes synchronization of the locally generated reference to the carrier of the received signal. As mentioned previously, synchronization may employ a pilot embedded in the received signal to align the locally generated reference with the carrier phase of the received signal.

The demodulated signal is then sampled based on an estimate of the symbol period. Timing recovery estimates the symbol period, and this estimate may be fed back to the complex demodulator and sampler to adjust the sampling rate (e.g., via a sampling phase error).

Equalization of the received samples suppresses the effects of ISI, caused by phenomena such as i) residual timing error, ii) pulse shape/multipath distortion from the propagation channel, and/or iii) approximation of the ideal transmit and receive filters for ease of implementation. Carrier recovery generates estimates for the difference in frequency and phase (collectively referred to as angle $\theta$) of the carrier used to modulate the symbols and the locally generated reference used for demodulation. A slicer examines each sample to generate either a soft or hard decision for the symbol that corresponds to the sample(s) under study. A slicer is a decision device that, responsive to the signal at its input, generates the projection of the nearest symbol value to the input signal from the grid of constellation points. The output of the slicer thus corresponds to one of the allowed, discrete levels. After symbol detection, a decoder reconstructs the transmitted data from the symbol sequence.

Equalization may be accomplished using a filter that has the inverse channel function of the communication channel. An estimate of the transmission characteristics of the communication channel (transfer function or impulse response) is either known or measured, and the equalization filter parameters may be set indirectly based on the estimate. The received signal is then passed through the equalizer, which compensates for the non-ideal communication channel by introducing "distortions" into the received signal which tend to cancel the distortions introduced by the communication channel.

For some digital transmission applications, such as digital television broadcasting, each receiver is in a unique location with respect to the transmitter. Accordingly, the characteristics of the communication channel are not known in advance, and may even change over time. For these applications, the equalizer may typically be an adaptive equalizer having variable filter parameters, or filter tap coefficients ("taps"), that are calculated by the receiver. The prior art includes many different methods for adjusting the equalizer filter parameters to restore signal quality to a performance level acceptable by subsequent error-correction decoding.

In some systems including an adaptive equalizer, the parameters of the equalizer filter(s) are set using a predetermined reference signal transmitted with the data, sometimes referred to as a training sequence. However, many systems may not insert a training sequence, and so a receiver typically employs blind equalization. In blind equalization, the equalizer's filter parameters are derived from the received signal itself, rather than by using a training sequence. In the prior art, it is known to adjust the equalizer parameters blindly based on an error term generated from a given cost criterion. For this blind equalization, either soft or hard decisions, or best estimates, of the original input symbols, are compared with the received signal to derive parameters of the equalizer filter(s).

However, when a signal includes a pilot, or DC offset component, included during modulation for synchronization, the pilot signal component degrades equalization performance of a receiver. Such performance may be significantly degraded when the receiver performs blind equalization. Prior art systems typically notch out the DC component in the frequency domain (i.e., notch filtering), or subtract the DC component from the signal (constellation) in the time domain. In the frequency domain, notch filtering generally introduces distortion and notch noise since the notch filter is not as narrow as the DC component that is filtered out. In the time domain, subtracting the DC component from the signal requires an estimate of the level of DC component at the receiver. The DC component is difficult to estimate since the magnitude of the DC component varies due to channel effects (e.g., noise, dispersion, and gain/attenuation) that vary with time.

A data model for the output samples y(n) of a combined channel-equalizer system is described by equation (1):

$$y(n) = \underline{h}'\underline{s}(n) + \underline{f}'\underline{w}(n), \quad (1)$$

where the vector $\underline{s}(n)$ contains a group of symbols representing the signal of interest coming from a single source or multiple sources, the vector $\underline{w}(n)$ represents added white noise, the vector $\underline{f}$ denotes the finite impulse response of the equalizer filter, and the vector $\underline{h}$ denotes the combined finite impulse response of the channel-receiver system (i.e., the contribution of f with the impulse response of the channel). When f is selected as the optimal solution f*, the combined equalizer-channel response approximates a pure delay and is the inverse of the channel response. The contribution of f* with the impulse response of the channel and receiver is the approximate inverse equalizer solution. The l-th component of the vector $\underline{s}(n)$ is denoted $a_l(n)+p$, where p represents a DC offset component that is included in the signal inserted at the transmitter. The DC offset component seen at the receiver may or may not be equivalent to the DC offset p introduced at the transmitter because of channel effects. Additive perturbations on the channel are included in the noise vector $\underline{w}(n)$ of dimension N. The noise contribution may be filtered by the receiver filter $\underline{f}$ of same dimension. The equalizer, through the vector $\underline{h}$, processes the source sequence.

One blind cost criterion employed for adaptive equalization is the constant modulus (CM) criterion. The stochastic gradient descent of the CM criterion is known as the Constant Modulus Algorithm (CMA). The CMA algorithm is described in an article by D. N. Godard entitled "Self-Recovering Equalization in Two-Dimensional Data Communication Systems," *IEEE Transactions on Communications*, vol 28, no. 11, pp. 1867-1875, October 1980, which is incorporated herein by reference. The CM criterion and CMA algorithm were further developed to de-couple equalization and carrier recovery functions in a receiver. Such use of the CM criterion and CMA algorithm for equalization is described in J. R. Triechler et al., "A New Approach to Multipath Correction of Constant Modulus Signals," *IEEE Transactions on Acoustics, Speech, and Signal Processing*, vol. ASSP-31, no. 2, April 1983, which is incorporated herein by reference. Systems that use such CMA algorithm for adaptive equalization, are described in U.S. Pat. No. 5,872,815 to Strolle et al.

The CM criterion penalizes the deviation of the dispersion of the magnitude squared of the received signal from a pre-calculated constant referred to as the "dispersion constant" or the "Godard radius." FIGS. 1A and 1B illustrate that the CM criterion is based on deviation from a "radius" about the origin of, for example, a source constellation. FIG. 1A shows a radius 101 of an 8-PSK (phase-shift keyed) constellation plotted for real (e.g., Re or I) and imaginary (e.g., Im or Q) components. In FIG. 1A, each point (symbol) lies on the circle 104 defined by this radius 101 (termed a constant modulus system), and the CM criterion penalizes distance of a received sample (e.g., sample 102) from this circle 104. Even though the constellation may rotate, the constellation remains on the circle, and so applying a CM criterion to this constellation does not penalize spatial rotation of the constellation due to residual carrier offset. FIG. 1B shows a 16-QAM (quadrature amplitude modulation) constellation plotted for real and imaginary components. In FIG. 1B, groups of points (symbols) lie on corresponding concentric circles 111, 112, and 113. The CM criterion defines a radius 114 of circle 115, which is not necessarily a radius of one of the concentric circles 111, 112 and 113 (termed non-constant modulus), as a "common" radial distance from the origin for the points of the constellation. As with the constellation of FIG. 1A, the CM criterion penalizes distance of a received sample (e.g., sample 103) from this circle 115.

The CM criterion defines a cost function $J_{CM}$ that may be expressed as given in equation (2):

$$J_{CM} = E[(|y_n(f)|^2 - \gamma)^2] \quad (2)$$

where E[•] denotes the expected value, γ is the dispersion constant (also known as the Godard radius), $y_n(f)$ is the discrete value that represents the sampled signal (see, e.g., equation (1), and f represents the linear filter (e.g., equalizer taps) introduced to suppress the ISI. The dispersion constant γ is a quantity that can be determined from the type of modulation employed (e.g., QAM, BPSK, etc.). The dispersion constant γ may be derived by calculation, by experiment, or by a combination of both for a particular implementation. For equation (2), the subscript "n" in the notation, such as $y_n$, indicates that the values are discrete time. Thus, notation of variables such as "y(n)" and "$y_n$," as used herein are equivalent.

If no DC offset is inserted in the symbol sequence at the transmitter, in the absence of noise and with all global impulse responses $\underline{h}$ reachable, the spike vectors $\underline{h}^*=\pm\underline{e}_k$ are global minima of the CM cost function with dispersion coefficient γ. The dispersion coefficient γ may be defined given as in equation (3):

$$\gamma = \frac{E\{a^4\}}{E\{a^2\}}. \qquad (3)$$

Derivation of global minima of the CM cost function is known in the art and is described in, for example, I. Fijalkow et al., "Adaptive Fractionally Spaced Blind Equalization," IEEE DSP Workshop, Yosemite, Calif., 1994, which is incorporated herein in its entirety by reference.

Equation (2) may be jointly optimized. Joint optimization allows for optimization of two or more variables of interest together. For example, the discrete value $y_n(\tau,0)$ may be dependent upon timing τ and phase θ. Substitution of $y_n(\tau,\theta)$ in equation (2) then yields a CM cost function that may be optimized, such as by deriving the gradient, with respect to timing τ and frequency θ.

For a real-valued source, such as VSB, the CM criterion, and its stochastic gradient, may be modified by taking the real part of $y_n(f)$ in equation (3). The modified CM criterion is referred to as the single-axis (SA) CM criterion, and is given in equation (4).

$$J_{SA-CM}=E[(Re(y_n(f))^2-\gamma)^2] \qquad (4)$$

where Re {•} denotes the real-part extraction.

The SA-CM criterion may be defined for VSB signals, such as described in a paper by Shah et al, "Global convergence of a single-axis constant modulus algorithm," *Proceedings of the Statistical Signal and Array Processing Workshop*, Pocono Manor, Pa., August 2000, which is incorporated herein by reference. SA-CM for VSB signals and blind cost error terms generated from the stochastic gradient of SA-CM criterion are also described in U.S. Pat. No. 6,418,164, entitled "A REDUCED COMPLEXITY BLIND EQUALIZER FOR MULTI-MODE SIGNALING," issued on Jul. 9, 2002, which is incorporated herein by reference.

Given a defined cost function, the gradient of the cost function may be derived. The stochastic gradient is an approximation of the true gradient that is calculated by taking the derivative of the cost function without taking the expected value. For example, the stochastic gradient of the CM criterion is known as the CM algorithm (CMA) and is derived by taking the derivative of equation (2) with respect to the variable of interest (for the gradient of the single-axis CM, the derivative is taken of equation (2) with respect to the (equalizer tap) function f).

Unfortunately, a pilot signal affects the process of blind equalization, which for VSB modulation is predominantly due to the effect of the DC offset of the received signal on the CM-derived error term. With an arbitrary DC offset, the CM cost criterion (function) admits local spurious minima in terms of the equalizer function applied to the received signal.

SUMMARY OF THE INVENTION

The present invention relates to generating an estimated correction for DC offset during equalization applied to a received signal. The estimated correction is then incorporated into the cost function, such as the constant modulus (CM) cost criterion, that may be employed to adaptively set equalizer parameters, such as tap coefficients. The estimate is generated by jointly minimizing a Constant Modulus (CM) cost function over a channel function related to the equalizer parameters and an estimate of DC offset in the received signal.

In accordance with an exemplary embodiment of the present invention, a level offset in a received signal is estimated by (a) generating an estimate of the offset from one or more current samples of the received signal based on a joint minimization of a cost criterion with respect to a channel response and the offset; and (b) adjusting the estimate of the offset based on one or more subsequent samples of the received signal in accordance with the joint minimization.

BRIEF DESCRIPTION OF THE DRAWINGS

Other aspects, features, and advantages of the present invention will become more fully apparent from the following detailed description, the appended claims, and the accompanying drawings in which:

FIG. 2 shows a receiver coupled to propagation medium and including an equalizer operating in accordance with exemplary embodiments of the present invention;

DETAILED DESCRIPTION

Figure 1B:
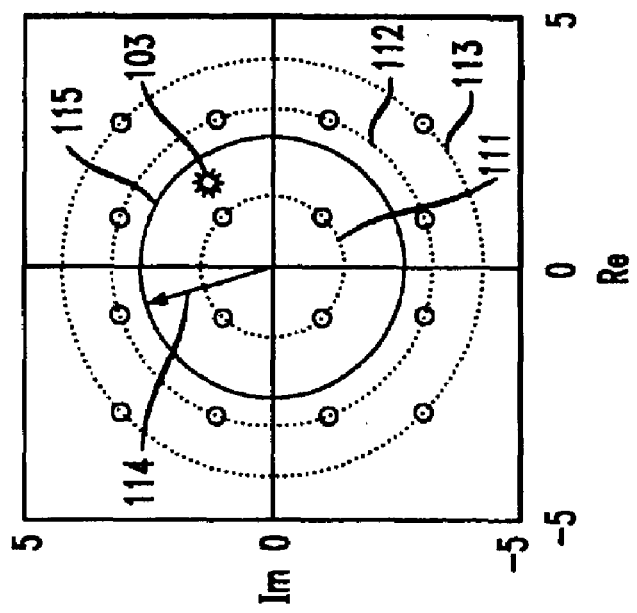
FIG 1B illustrates a constant modulus criterion based on determining a radius about the origin of a 16-QAM source constellation.
Figure 1A:
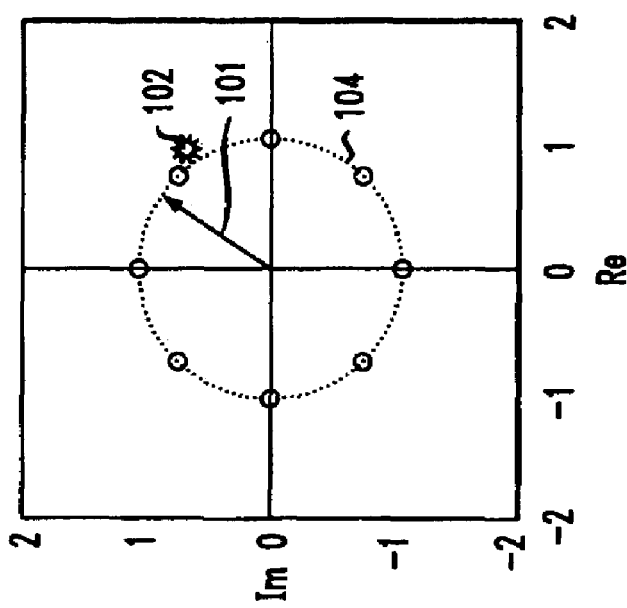
FIG. 1A illustrates a constant modulus criterion based on determining a radius about the origin of an 8-PSK source constellation.

The present invention relates to generating an estimated correction for DC offset during equalization applied to a received signal. The estimated DC offset is incorporated into the cost function, such as the constant modulus (CM) cost criterion that is employed to adaptively set equalizer parameters, such as tap coefficients, approximating the inverse of the channel response through which the received signal passes. The estimated DC offset is generated by jointly minimizing a Constant Modulus (CM) cost function over the equalizer function and estimated DC offset.

FIG. 2 shows receiver 200 coupled to propagation medium 201 by sensor 202. Receiver 200 includes equalizer 204 operating in accordance with an exemplary embodiment of the present invention. Through sensor 202, receiver 200 detects and receives signals passing through medium 201.

Receiver 200 receives signals that are generated and passed to medium 201 by a transmitter, such as a broadcast station (not shown), that encodes and modulates an information source s(n) (such as video, audio and/or other data). The encoded signal s(n) is modulated onto the phase and/or amplitude of a suitable carrier frequency for transmission through medium 201.

Receiver 200 may be employed in a digital communication system broadcasting digital television signals in accordance with, for example, the ATSC standard for digital television, "ATSC Digital Television Standard," September 1995. Consequently, the preferred embodiments of the present invention operate on received signals having complex VSB modulation format. VSB is the modulation format adopted for terrestrial broadcast of digital television signals in the United States by the ATSC standard. However, the present invention is not so limited and may be employed with other modulation formats, such as pulse amplitude modulation (PAM) and quadrature amplitude modulation (QAM) commonly employed in digital television broadcast standards.

Receiver 200 includes front-end circuitry 203 that performs several functions. Front-end circuitry 203 includes complex demodulation of the received signal from RF to intermediate frequency (IF), and complex demodulation of the received signal at IF to near passband employing a locally generated reference for the carrier signal. The demodulated signal is sampled based on an estimate of the symbol period, and timing recovery estimates the symbol timing period. The sampling rate may be adjusted via feedback (e.g., via a sampling phase error). Timing recovery may then track variations in the detected period and phase of the symbol period.

Equalizer 204 provides equalization of the received signal to compensate for inter-symbol interference (ISI), a distortion, and similar channel effects (here, the term channel may also include effects of front-end circuitry 203). Equalization may be accomplished with forward and feedback filters (not shown in FIG. 2) realizing an infinite impulse response (IIR) equalizer, or an IIR in a decision feedback equalizer (DFE). Equalizer 204 includes equalizer filter 208 that applies an equalization filter function to the received signal input to equalizer 204, and equalizer filter 208 may be defined by a set of filter tap values. Equalizer 204 further comprises a pilot removal generator 210 and tap update generator 212.

Pilot removal generator 210 employs methods as described subsequently to generate an estimate $\hat{p}$ of a DC offset that is included in the received signal applied to equalizer 204. Pilot removal generator 210 employs a cost function error term that may be generated by tap update generator 212. Tap update generator 212 generates the cost function error term and update equalizer tap values based on the input and output samples of equalizer 204. In accordance with embodiments of the present invention, the estimate $\hat{p}$ of the DC offset generated by pilot removal generator 210 may be subtracted from the received signal by equalizer 204. The estimate $\hat{p}$ is subtracted either through the tap values applied to equalizer filter 208 (as shown in FIG. 2) or by a separate circuit (not shown in FIG. 2) operating on the received signal input to equalizer 204.

Carrier recovery may be employed to estimate carrier phase error for rotation/de-rotation of equalized samples, and may be implemented within equalizer 204. Decision device 205 (e.g., a slicer) generates symbols from equalized samples. Decoder 206 decodes the symbols from decision device 205, and may include forward error correction (FEC) decoding.

Equalizer filter 208 of equalizer 204 may be implemented as a multi-tap filter where the tap coefficients are adaptively set by tap update generator 212. Such adaptive equalization employs a cost function, which for the preferred embodiments is the constant modulus (CM) cost criterion, and may be the CM cost function defined for single axis functions (SA-CM cost function). More specifically the actual or estimated error is derived from the minimization of the cost function with respect to the variable(s) of interest, which may be a joint optimization including the variable estimated DC offset. In practice, the optimization yields an error term between actual and desired value of the variable of interest. To generate the estimate of the error for a given sample or observation, a recursive update algorithm may be employed. Correction for DC offset in accordance with exemplary embodiments of the present invention accounts for the DC offset within the error terms generated for the cost function.

The data model as described in equation (1) may be employed for use with equalizer 204. Briefly, the output sample $y_n$ of a combined channel-equalizer system is described by equation (1), repeated below:

$$y_n = \underline{h}^t \underline{s}_n + \underline{f}^t \underline{w}_n. \tag{1'}$$

where the vector $\underline{s}_n$ contains a group of symbols representing the signal of interest coming from a single source or multiple sources, the vector $\underline{w}_n$ represents added white noise, the vector $\underline{h}$ denotes the combined finite impulse response of the channel-receiver system, and the vector $\underline{f}$ denotes the finite impulse response of the linear filter applied to the added white noise. For equation (1'), the subscript "n" in the notation, such as $y_n$, indicates that the values are discrete time. Thus, notation of variables such as "y(n)" and "$y_n$" as used herein are equivalent.

The l-th component of the vector $\underline{s}_n$ is denoted $a_l$+p, where p represents a DC offset contribution inserted at the transmitter. The sequence $\{a_n\}_{n \in Z}$ of each source symbol defines a zero-mean, sub-gaussian stochastic process (Z represents a time index). The value $E\{a^2\}$ is defined as the variance of the unbiased source signal, where $E\{a^2\}$ is the mathematical "expected value of $a^2$". The DC offset p added to the source symbols is, for example, a pilot signal introduced to help the receiver in carrier synchronization (e.g., a pilot signal embedded in a complex VSB modulated signal). Additive perturbations on the channel are included in the noise vector $\underline{w}_n$ of dimension N. The noise $\underline{w}(n)$ may be Gaussian, temporally and spatially white with zero-mean and variance $E\{w^2\}$. The noise contribution is filtered by the linear receiver function $\underline{f}$ of same dimension. Vectors $\underline{h}$ and $\underline{s}_n$ are defined having a length M, M an integer greater than zero.

Using the data model of equation (1') and CM function (cost criteria) of equations (2) and (4), the CM-derived adaptive equalizer for, for example, equalizer 204 is now described. A new CM cost function is defined in which an estimate of the DC offset is subtracted from the received channel output $y_n(f)$. The parameter $\hat{p}$ represents a value (estimate) introduced in the receiver (e.g., equalizer 204) to compensate for the DC component p that is inserted in the transmitter. The new CM cost function for the single axis case, denoted as the function $J_{SA\text{-}CM}^{(dc)}$, is as defined in equation (5):

$$J_{SA\text{-}CM}^{(dc)}(f,\hat{p}) = E\{(Re(y_n(f) - \hat{p})^2 - \gamma)^2\}. \tag{5}$$

CM-based equalization in accordance with embodiments of the present invention determines the joint minima of the new CM cost function (e.g., either equation (2) or (4) accounting for estimate $\hat{p}$). For the single axis case, the joint minima of a CM cost function may be defined as the minima of the function $J_{SA\text{-}CM}^{(dc)}$ in equation (5) with respect to the filter vector f and estimate $\hat{p}$. As before, the dispersion constant of the CM criterion is denoted by $\gamma$. The local minima of parameter $\hat{p}$ of the function $J_{SA\text{-}CM}^{(dc)}$ are denoted $\hat{p}_*$.

As described previously, if no DC offset is inserted in the symbol sequence at the transmitter, in the absence of noise and with all global impulse responses $\underline{h}$ reachable, the spike vectors $\underline{h}^* = \pm \underline{e}_k$ are global minima of the CM cost function with dispersion coefficient $\gamma$. The spike vectors $\underline{h}^* = \pm \underline{e}_k$ have the non-zero component +1 located at the (k+1)-th position.

However, when the transmitter inserts a DC offset and the source is biased, as described with equation (4), then the minima of the CM cost function given in equation (5) depend on the DC offset p introduced at the source. If the DC offset estimate $\hat{p}$ of the received signal is a sub-optimal selection, then the CM criterion admits local, spurious minima (because of channel effects, $\hat{p}$ does not necessarily equal p). For a given dispersion constant $\gamma$ and when the transmitted and estimate DC offsets are equivalent (i.e., given $\hat{p}=p$), only the vectors $\underline{h}=\text{sign}(p)\underline{e}_k$ for k∈("an element of") $\{0, \ldots, M-1\}$ are global minima of the function $J_{SA\text{-}CM}^{(dc)}(\underline{h},\hat{p})$ (note that h and f are related through h being the combination of filter response f with the channel response). Polarity of the global minima is determined from the corresponding sign of the DC offset that is embedded by the transmitter. The vectors $$\underline{h}^* = -\text{sign}(p)\underline{e}_k$$

are no longer global minima of the criterion $J_{SA\text{-}CM}^{(dc)}(\underline{h}, \hat{p})$ as they are for the CM criterion when the source is unbiased.

Thus, the global minima of the CM criterion change when the DC offset is known by the receiver (if the DC offset p introduced at the source is removed at the output of the CM receiver). By selecting $\hat{p}=p$ to correct for the bias of the DC offset, only half of the global minima of the CM criterion for an unbiased source remain global minima of the criterion when the source is biased and when such a correction is applied. In addition, setting $\hat{p}=p$ does not guarantee convergence of the solution to joint minimization because of the local, spurious minima. However, setting $\hat{p}=p$ at the receiver during an initialization phase, as discussed subsequently, may allow an algorithm adaptively generating the DC offset estimate $\hat{p}$ a greater likelihood of convergence to the correct solution.

Figure 3:
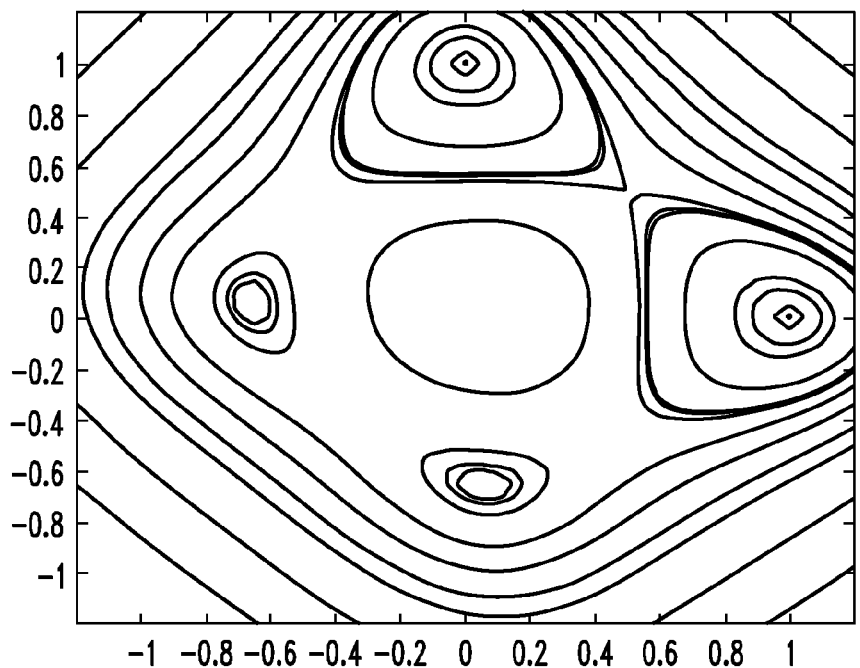
FIG. 3 shows the contour of the CM criterion with a first DC offset.
Figure 4:
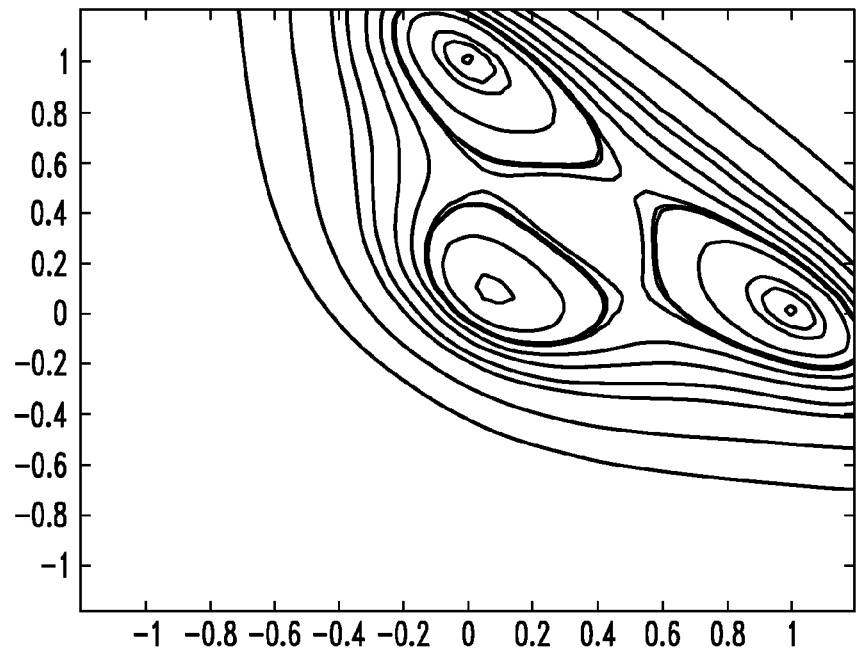
FIG. 4 shows the contour of the CM criterion with a second DC offset.

FIGS. 3 and 4 further illustrate the effects of correction for signal bias arising from DC offset. FIGS. 3 and 4 show contour lines for the cost surface of the criterion of equation (4) for $\underline{h}$ defined with a two-tap, global impulse response and BPSK signaling ($a_t = \pm 1$) for symbols $\underline{s}_n$. FIG. 3 shows the contour of the CM criterion with offset $\hat{p}=p=0.25$, while FIG. 4 shows the contour of the CM criterion with offset $\hat{p}=p=1.25$. For both cases shown in FIGS. 3 and 4, the DC offset estimate at the receiver is selected as substantially equivalent to the DC offset inserted at the transmitter, and, in both cases, the CM criterion admits the pair of desirable global minima (0, 1) and (1,0). However, the minima at negative polarities (i.e., those closest to (0, −1) and (−1, 0)) have moved away from spike vectors (0, −1) and (−1, 0). As shown in FIG. 3, with the smaller DC offset estimate ($\hat{p}=p=0.25$), these minima at negative polarities have moved to approximately (−0.7, 0.1) and (0.1, −0.7). In FIG. 4 with the larger DC offset these minima of negative polarities have essentially collapsed to a location about the original (0, 0).

Thus, selecting $\hat{p}=p$ as a correction for DC offset within the receiver is not necessarily an optimal choice for good equalization performance.

In accordance with the present invention, equalizer 204 (FIG. 2) derives an estimate for optimal DC offset estimate (correction) $\hat{p}$. Exemplary embodiments of methods to generate a solution for the estimate of optimal DC correction are now described.

First, the following described the effect of accounting for the DC offset estimate $\hat{p}$ in the CM cost criterion. The CM criterion (cost function) $J_{SA\text{-}CM}^{(dc)}(f,\hat{p})$ of equation (5) may be re-written as in equation (6):

$$J_{SA\text{-}CM}^{(dc)}(f,\hat{p}) = J_{SA\text{-}CM}(f,0) + \epsilon^4 + 6\epsilon^2(E\{z^2\} - \gamma/3) \qquad (6)$$

where $$\epsilon = \hat{p} - E\{y\}$$

and $J_{SA\text{-}CM}(f,0)$ is the prior art single-axis CM cost function (i.e., that given in equation (4) which does not account for the dc offset $\hat{p}$. For the single-axis case, $J_{SA\text{-}CM}(f,0)$ is an unbiased CM cost function as given in equation (7):

$$J_{SA\text{-}CM}(f,0) = E\{(\underline{h}^t\underline{a}_n + \underline{f}^t\underline{w}_n)^2 - \gamma)^2\}. \qquad (7)$$

The terms $\epsilon^2$ and $\epsilon^4$ may be considered to be additive constraints on the unbiased CM criterion. The term $E\{z^2\}$ denotes the power of the receiver output of the unbiased signal defined as in equation (8):

$$z_n = \underline{h}^t\underline{a}_n + \underline{f}^t\underline{w}_n. \qquad (8)$$

An estimate of the DC offset may be generated by an optimization of the cost function $J_{SA\text{-}CM}^{(dc)}(f, \hat{p})$ in equation (6) with respect to the parameter $\hat{p}$, yielding a characterization of the minima $\hat{p}_*$ of the cost function $J_{SA\text{-}CM}^{(dc)}(f, \hat{p})$. The estimate $\hat{p}$ may be approximated with methods described below.

The minima $\hat{p}_*$ of the cost function $J_{SA\text{-}CM}^{(dc)}(f, \hat{p})$ as given in equation (5) with respect to DC correction term $\hat{p}$ are given in equations (9) and (10):

$$\hat{p}_* = E\{y\}, \text{ and} \qquad (9)$$

$$\hat{p}_* = E\{y\} \pm \sqrt{\gamma - 3E\{z^2\}}. \qquad (10)$$

As determined by the inventors, if $$\left(E\{z^2\} - \frac{\gamma}{3}\right)$$

is positive, then the value of equation (9) corresponds to a minimum and a value for equation (10) does not exist, If $$\left(E\{z^2\} - \frac{\gamma}{3}\right)$$

is negative, then the value of equation (9) corresponds to a global maximum and a value for equation (10) exists and defines two global minima. The solution $\hat{p}_* = E\{y\}$ corresponds to the case where the power constraint $$\left(E\{z^2\} - \frac{\gamma}{3}\right)$$

is positive, and the joint cost function $J_{SA-CM}^{(dc)}(\underline{f}, \hat{p})$ is equivalent to the CM cost function with an unbiased source. Therefore, no local spurious minima are introduced into the equalizer values.

Adaptive algorithms may be employed to provide an estimate of this desired solution for $\hat{p}$. For example, the estimated DC correction term may either be 1) calculated directly with an empirical estimator of $E\{y\}$, such as by an average over a number of observations, or 2) deduced as a stationary point of a stochastic gradient algorithm minimizing $J_{SA-CM}^{(dc)}(\underline{f},\hat{p})$ over $\hat{p}$.

The first approach to compute an empirical estimator of $E\{y\}$ employs a relatively simple calculation of the mean of the equalizer output. One method to recursively calculate the mean of the equalizer output employs a leaky integrator described by equation (11), $$\hat{p}_{t+1} = (1-\alpha)\hat{p}_t + \alpha y_n \tag{11}$$

where $\alpha$ is typically selected as a relatively small value, and may be typically selected as $$\alpha \sim \frac{1}{M}$$

where M is the length of filter $\underline{f}$.

Alternatively, a gradient optimization technique of the CM criterion leads to an adaptive algorithm given in equation (12), $$\hat{p}_{t+1} = \hat{p}_t + \eta \mu \epsilon_y \tag{12}$$

where $$\epsilon_y = ((y_n - \hat{p}_t)^2 - \gamma)(y_n - \hat{p}_t)$$

and $\eta = -\text{sign}$ $$\left(E\{z^2\} - \frac{\gamma}{3}\right).$$

The scalar $\mu$ is a positive number, usually selected as a small value. Implementing the calculation of $-\text{sign}$ $$\left(E\{z^2\} - \frac{\gamma}{3}\right)$$

is difficult, and increases complexity of a given implementation. Consequently, a given implementation may either 1) choose to ignore the term $\eta$, or 2) use an approximation for the calculation of $\eta$, such as by a leaky integrator approximation.

Numerical computational complexity between these two approaches is relatively equivalent. The term $\epsilon_y$ in equation (16) may be computed during the process of adaptively updating the taps of the CM-based equalizer (e.g., equalizer 204 of FIG. 2), and, thus, may be available for the adaptation of the DC correction term in equation (12). The polarity indicator $\eta$ may be evaluated to determine the sign of the power constraint and to guarantee convergence to the desired solution $\hat{p}_* = E\{y\}$. However, the following discussion shows that a solution is justified if the polarity indicator $\eta$ is not expressly calculated to provide the polarity for the estimate of $\hat{p}$.

If the polarity indicator $\eta$ is not calculated to save compaction steps, then the extrema of the joint cost function $J_{SA-CM}^{(dc)}(\underline{f}, \hat{p})$ with respect to the vector $\underline{f}$ are identified to verify the non-existence of local spurious minima. Assuming that all vectors $\underline{h}$ are achievable in the absence of noise, the joint optimization of the criterion $J_{SA-CM}^{(dc)}(\underline{f}, \hat{p})$ admits channel-equalizer extreme $\underline{h}^*$ of the form given in equation (13):

$$h^* = h^* \sum_{k \in v} \underline{e}_k \tag{13}$$

where v denotes the set of indices associated to non-zero components of the vector $\underline{h}^*$. The cardinality of v (i.e., the number of non-zero components of $\underline{h}^*$) is denoted by $|v|$, and $h^*$ is a scalar. The extrema of equation (13) are classified as follows in equations (14) through (19) given the existence of the solutions for the estimate of DC-offset in equations (9) and (10). Equations (14) through (16) are extrema if $\hat{p}_* = E\{y\}$:

$$\underline{h}^* = \underline{0} \text{ (a maximum)} \tag{14}$$

$$\underline{h}^* = \pm \sqrt{\gamma \frac{E\{a^2\}}{E\{a^4\}}} \, \underline{e}_k \text{ for } k \in \{0, \cdots, M-1\} \text{ (global minima)} \tag{15}$$

$$\underline{h}^* = \pm \sqrt{\frac{\gamma}{\sigma_a^2}} \sqrt{\frac{1}{k_a - 3 + 3|v|}} \sum_{k \in v} \underline{e}_k \text{ with } |v| > 1 \text{ (saddle points)} \tag{16}$$

Similarly, equations (17) through (19) are extrema if $$\hat{p}_* = E\{y\} \pm \sqrt{\gamma - 3E\{z^2\}}:$$

$$\underline{h}^* = \underline{0} \text{ (a minimum)} \tag{17}$$

$$\underline{h}^* = \pm \sqrt{\gamma \frac{E\{a^2\}}{E\{a^4\}}} \sqrt{\frac{2k_a}{9 - k_a}} \, \underline{e}_k \text{ for } k \in \{0, \cdots, M-1\} \text{ (global maxima)} \tag{18}$$

$$\underline{h}^* = \pm \sqrt{\frac{\gamma}{\sigma_a^2}} \sqrt{\frac{-2}{k_a - 3 + 6|v|}} \sum_{k \in v} \underline{e}_k \text{ with } |v| > 1 \text{ (saddle points)} \tag{19}$$

where $k_a$ given in equation (20) is the kurtosis of the unbiased source:

$$k_a = \frac{E\{a^4\}}{E\{a^2\}^2}. \tag{20}$$

The extrema classification of the equalizer functions in equations (14) through (19) are associated with each of the solutions of equations (9) and (10). The solution $\hat{p}_* = E\{y\}$ corresponds to the case where the correct sign is selected for η when the polarity indicator is not expressly calculated. At the solution $\hat{p}_* = E\{y\}$, the joint CM cost function is equivalent to the CM cost function with an unbiased source. In the absence of noise, and for a perfectly invertible channel, the minima of the joint cost function therefore provide relatively perfect source recovery (up to a given scale factor that may be known and may be pre-computed). Thus when the power constraint $$\left(E\{z^2\} - \frac{\gamma}{3}\right)$$

is positive, the stochastic optimization of the joint CM criterion converges to desirable equalizer settings.

For the solution $$\hat{p}_* = E\{y\} \pm \sqrt{\gamma - 3E\{z^2\}},$$

corresponding to selecting the incorrect sign for polarity indicator η, desirable equalizer settings that furnish a perfect estimation of the source are defined as the global maxima of the joint CM criterion. These global maxima may be determined by examination of the gradient ascent, rather than gradient descent, of the cost criterion. However, the choice of gradient ascent or descent of equalizer coefficient adaptation also requires the calculation of a polarity indicator η. Thus, polarity selection is no longer expressly a part of estimating DC correction with adaptive update process, but rather is incorporated into the equalizer parameter (tap) adaptive update process.

Figure 5:
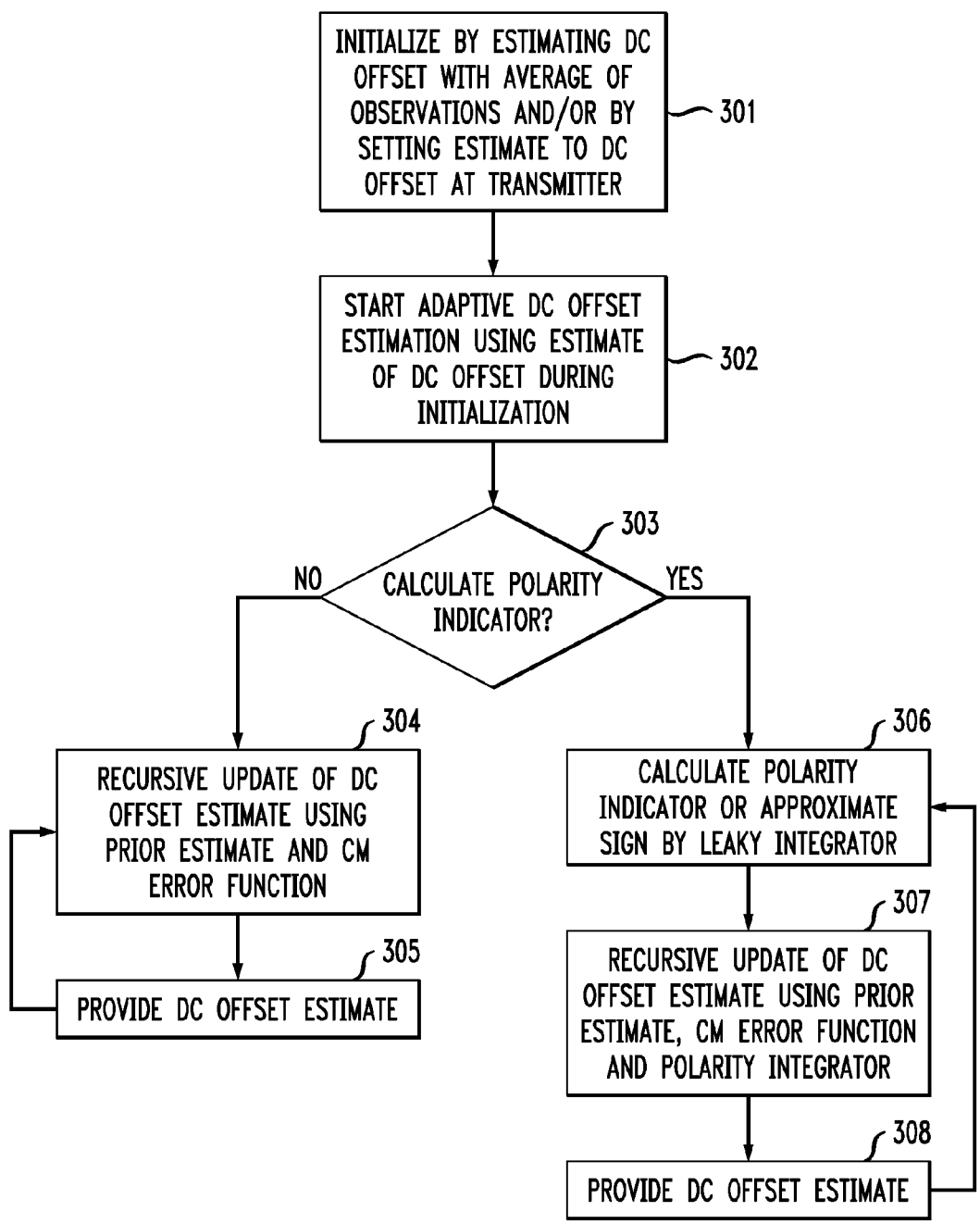
FIG. 5 is a flow chart illustrating the method of DC offset correction in accordance with an exemplary embodiment of the present invention.

FIG. 5 is a flow chart illustrating the method of DC offset correction in accordance with an exemplary embodiment of the present invention. At step 301, the method of DC offset correction begins initialization by generating initial values for the DC offset estimate $\hat{p}$ that is to be subtracted from the received signal. At step 301, an initial estimate may be the a priori known value of p inserted at the transmitter, or may be estimated from the observations (samples of the received signal) input to the equalizer. The estimate from the observations may be derived as an average of the expected values, which may be approximated by the leaky integrator algorithm of equation (11). The leaky integrator algorithm is a recursive algorithm, generating a current value of $\hat{p}$ based on the previous value (corresponding to current and previous samples of the received signal). Some embodiments may employ $\hat{p}=p$ to initialize the leaky integrator algorithm.

At step 302, the method switches to an adaptive DC offset estimation algorithm, and initializes the algorithm using the current value for $\hat{p}$ from step 301. The adaptive DC offset estimation algorithm for the single axis case may be based on the adaptive algorithm given in equation (11) or (12). At step 303, a test determines whether the algorithm employs a polarity indicator to generate the estimate. If the test of step 303 determines that the polarity indicator is not calculated, then at step 304 the adaptive algorithm updates the current value of $\hat{p}$, for example, using either 1) equation (11) or 2) equation (12) without the polarity indicator. At step 305, the current estimate $\hat{p}$ is provided to, for example, the tap update generator to produce the next set of equalizer filter taps, or a subtracter to subtract the estimate $\hat{p}$ from the received signal. From step 305, the method returns to step 304 to continue the recursive update process.

If the test of step 303 determines that the polarity indicator is calculated, then the method advances to step 306. At step 306 a polarity indicator is generated, either 1) by express calculation of the quantity in equation (12) or 2) by estimating the polarity indicator. The polarity indicator may be updated by a recursive, leaky integrator algorithm similar to that of equation (11). At step 307, the adaptive algorithm updates the current value of $\hat{p}$ using equation (12) with the polarity indicator calculated in step 306. From step 308, the method returns to step 306 to continue the recursive update process.

Figure 6:
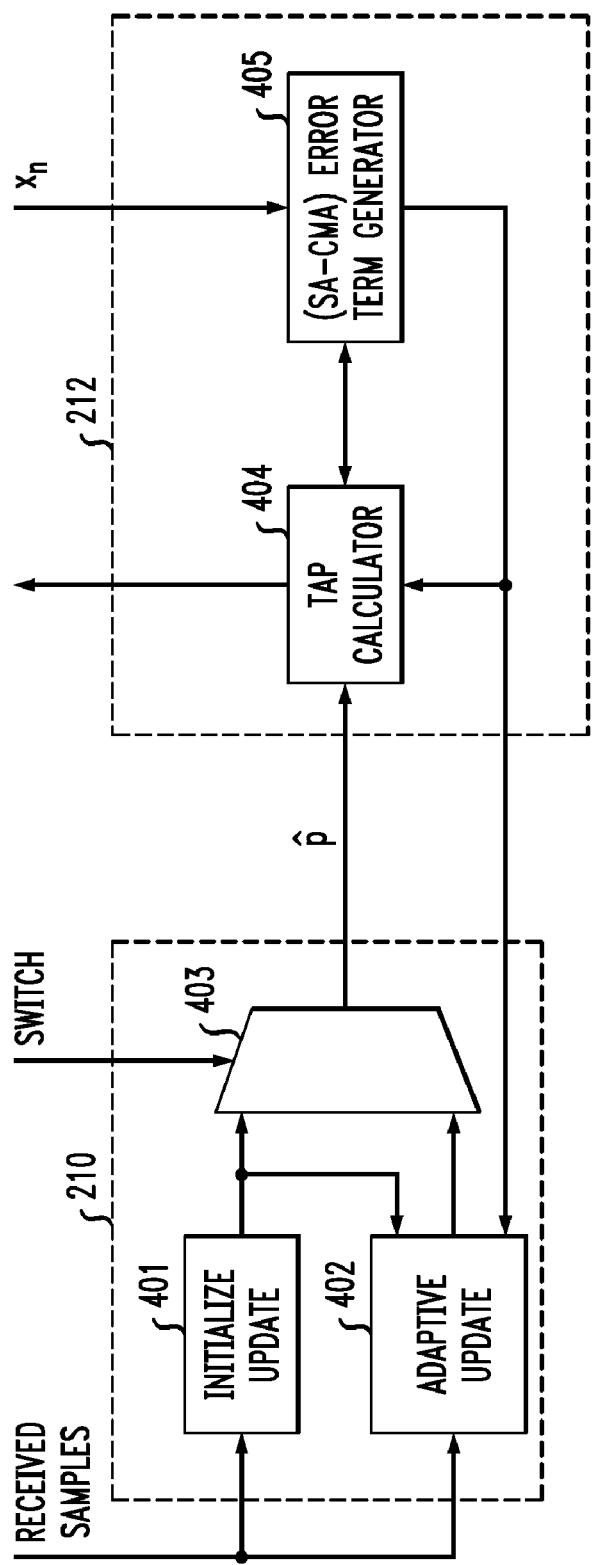
FIG. 6 shows a block diagram of a pilot removal generator and a tap update generator implementing a method of DC offset correction such as shown in FIG. 5.

FIG. 6 shows a block diagram of Pilot removal generator 210 and tap update generator 212 implementing a method of DC offset correction such as shown in FIG. 5. Pilot removal generator 210 includes initialize update module 401, adaptive update module 402, and mux 403. Tap update generator includes tap calculator module 404 and error term generator 405.

Samples of the received signal are applied to initialize update module 401 and adaptive update module 402. Initialize update module 401 generates DC estimate $\hat{p}$ from the samples in a manner such as described with respect to step 301 of FIG. 5. Based on the signal switch being disabled, mux 403 provides as its output the DC estimate $\hat{p}$ from initialize update module 401. DC estimate $\hat{p}$ from mux 403 is provided to tap calculator module 404, which generates a set of filter taps for equalizer filter 208 in FIG. 7. Operation of the filter taps applied to the received signal subtracts $\hat{p}$ from the received signal. Based on the equalized signal $x_n$ from equalizer filter 208 and the filter taps, error term generator 405 updates the current cost criterion (e.g., SA-CM cost criterion) error term calculated and used to adaptively set the equalizer filter taps. The error term is provided to adaptive update module 402.

Adaptive update module 402 also receives the samples of the received signal and is initialized using the current estimate of $\hat{p}$ from initialize update module 401 (corresponding to step 302 of FIG. 5). After a certain period of time, signal switch is enabled, causing mux 403 to provide DC estimate $\hat{p}$ from adaptive update module 401 (corresponding to steps 303-305 or 303-308 of FIG. 5). The signal switch may be enabled based on a predefined value generated from simulation or through performance measure monitoring. When the signal from either the equalizer filter 208 or decision device 205 reaches and/or exceeds a performance measure (e.g., signal quality, bit error rate, power constraint, or steady state equalization) the switch signal is enabled.

For some exemplary embodiments, equalizer 204 in FIG. 2 may be implemented with forward and feedback filters to provide an equalizer filter with an infinite impulse response (IIR). In addition, the IIR equalizer filter may be in a decision feedback equalizer (DFE) configuration in which symbol decisions from a decision device are applied to the feedback filter.

Figure 7:
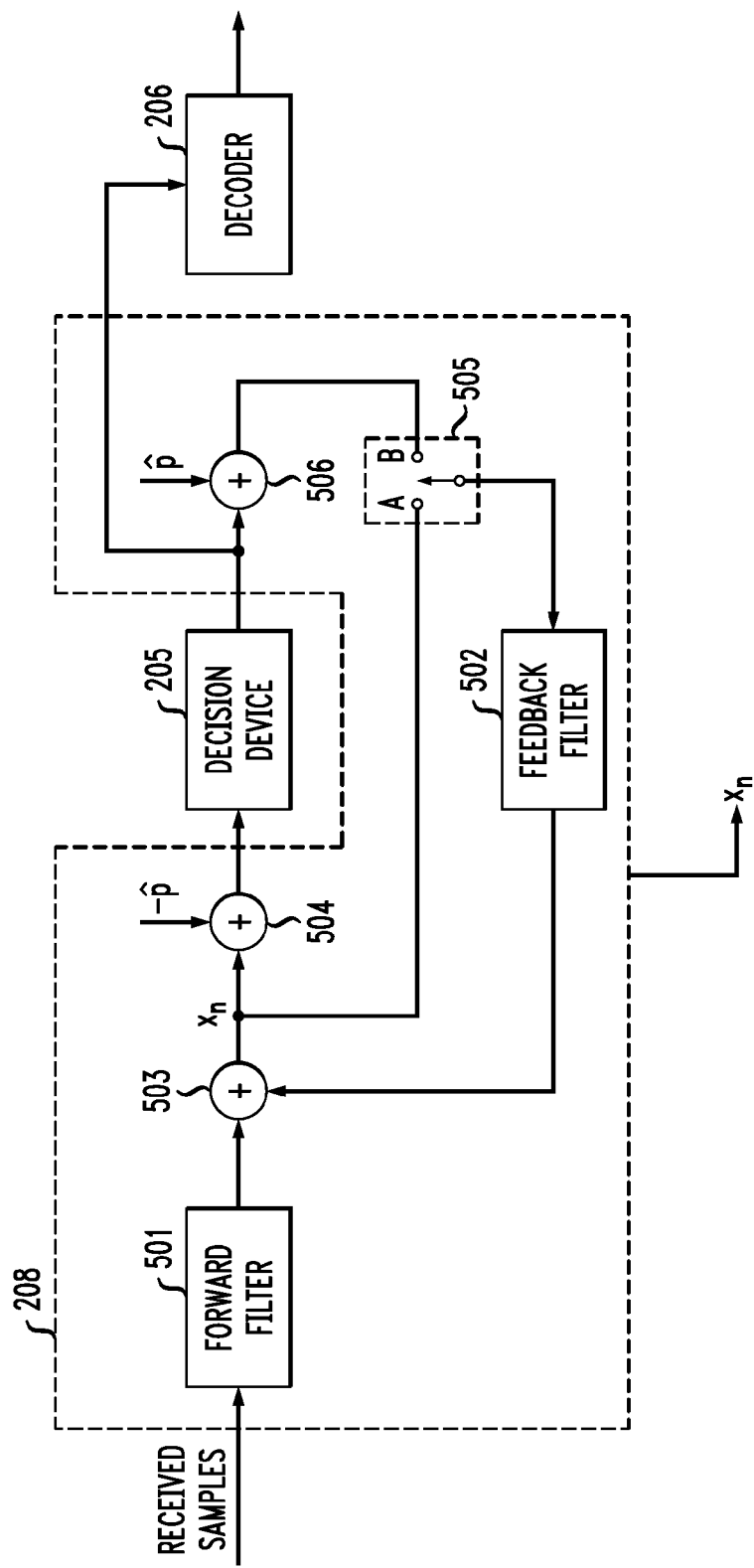
FIG. 7 shows a block diagram of DC offset correction implemented for either an IIR or IIR DFE equalizer.

FIG. 7 shows a block diagram of DC offset correction implemented for either an IIR or DFE equalizer. As shown in FIG. 7, equalizer filter 208 comprises forward filter 501, feedback filter 502, adders 503, 504 and 506. Switch 505 is optional and, if switch 505 is in position A, the forward filter 501 and feedback filter 502 are configured as an IIR equalizer (feedback filter 502 operates on equalized, received samples from adder 503). When switch 505 is in position B, forward filter 501 and feedback filter 502 are configured as a DFE equalizer (feedback filter 502 operates on symbol decisions from decision device 205). The DC offset estimate $\hat{p}$ may be generated by Pilot removal generator 210 in cooperation with error term generator 405 as described previously.

When switch 505 is in position A, the IIR equalizer generates an equalized, received sample sequence from adder 503. The IIR equalizer compensates for DC offset in the received signal by subtracting (i.e., adding the complement of) the estimated DC offset p̂ from the equalized, received signal at adder 504. The equalized and DC compensated signal is then provided to decision device 205 which generates symbol decisions for subsequent decoding by decoder 206.

When switch 505 is in position B, the DFE equalizer first compensates for DC offset in the received signal by subtracting (i.e., adding the complement of) the estimated DC offset p̂ from the equalized, received signal at adder 504. Thus, adder 504 provides an equalized, DC compensated signal to decision device 205. Decision device 205 generates a symbol decision based on the equalized and DC compensated signal that is provided to decoder 206 for decoding. However, for proper equalization, the signal applied to feedback filter 502 should still contain a DC offset since the signal from forward filter 501 contains a DC offset. Thus, the estimated DC offset p̂ is added to the symbol decision from decision device 205 at adder 506. The DC offset-biased decision from adder 506 is then provided to feedback filter 502.

The techniques of the present invention may be extended to other cost functions, such as the mean squared error (MSE) cost function. For some implementations of a receiver, the equalizer may switch from CM based error terms to MSE-based error terms for improved steady state performance. An MSE cost function for a biased signal (including DC offset) is given by equation (21):

$$J_{mse}^{(dc)}(h,\hat{p}) = E\{|y(n)-\hat{p}-a(n-d)|^2\}, \quad (21)$$

where d is a delay varying between 0 and (M−1). The MSE cost function may be jointly minimized and may be applied to other forms of modulated signals, such as QAM and PAM signals.

Although the present invention is described herein with respect to certain cost functions, the present invention is not so limited and may be extended in general to any type of cost functions. For example, one skilled in the art may extend the teachings herein to include criteria of Bussgang-class cost functions that may be related to the CM and SA-CM cost function described herein. The Bussgang-class of functions are well-known in the art and are described in, for example, Simon Haykin, *Blind Deconvolution,* Chapter 2, PTR Prentice-Hall, Englewood Cliffs, N.J. (1994), whose teachings are incorporated herein by reference.

The present invention has been described with respect to a digital television receiver, and in particular, to digital television signals transmitted as symbols with a vestigial sideband modulation (VSB). However, one skilled in the art would realize that the techniques described herein may be applied to any receiver processing QAM, PSK, or other similarly modulated signals.

As would be apparent to one skilled in the art, the various functions may be implemented with circuit elements or may also be implemented in the digital domain as processing steps in a software program. Such software may be employed in, for example, a digital signal processor, microcontroller, or general-purpose computer.

The present invention can be embodied in the form of methods and apparatuses for practicing these methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of estimating a level offset in a received signal, comprising the steps of:
   (a) updating an equalizer function based on a joint minimization of a cost criterion with respect to a channel response and the offset;
   (b) generating an estimate of the offset from one or more current samples of the received signal based on an error term derived from the joint minimization; and
   (c) adjusting the estimate of the offset based on one or more subsequent samples of the received signal in accordance with the joint minimization.

2. The method as recited in claim 1, further comprising the step of:
   (d) applying the adjusted estimate of the offset to the received signal.

3. The method as recited in claim 2, wherein step (d) comprises the steps of:
   (d1) generating, for an equalizer, the equalizer function accounting for the adjusted estimate of the offset;
   (d2) applying the equalizer function to the received signal.

4. The method as recited in claim 1, comprising the step of generating an initial estimate of the offset.

5. The method as recited in claim 4, wherein the initial estimate is set as the value for the offset applied to the signal prior to transmission to a receiver of the received signal.

6. The method as recited in claim 4, wherein the initial estimate p̂ is set as an average over one or more samples.

7. The method as recited in claim 6, wherein the average at time t+1 over one or more samples represents a mean of the received signal that is approximated by a leaky integrator of the form:

$$\hat{p}_{t+1} = (1-\alpha)\hat{p}_t + \alpha y_n,$$

where $y_n$ is the current sample and $\alpha$ is the step size.

8. The method as recited in claim 1, wherein step (c) adjusts the estimate based on a recursive algorithm approximating the joint minimization.

9. The method as recited in claim 1, wherein the cost criterion subject to joint minimization is selected from a Bussgang class of cost functions.

10. The method as recited in claim 1, wherein the cost criterion subject to joint minimization is a constant modulus (CM) cost criterion of the form:

$$J_{CM}^{(dc)}(f,\hat{p}) = E\{(|y_n(f)-\hat{p}|^2-\gamma)^2\},$$

where f represents the channel function, $\hat{p}$ is the estimate of the offset, $\gamma$ is the dispersion coefficient, and $y_n$ is the current sample.

11. The method as recited in claim 1, wherein the cost criterion is a single axis constant modulus (SA-CM) cost criterion of the form:

$$J_{SA-CM}^{(dc)}(f,\hat{p})=E\{(Re(y_n(f)-\hat{p})^2-\gamma)^2\}$$

where f represents the channel function, $\hat{p}$ is the estimate of the offset, $\gamma$ is the dispersion coefficient, and $y_n$ is the current sample.

12. The method as recited in claim 11, wherein the recursive algorithm is a gradient optimization algorithm of the form:

$$\hat{p}_{t+1}=\hat{p}_t+\eta\mu\epsilon_y,$$

where $y_n$ is the received sample, $$\epsilon_y=((y_n-\hat{p}_t)^2-\gamma)(y_n-\hat{p}_t)$$

and $\eta=-\text{sign}$ $$\left(E\{z^2\}-\frac{\gamma}{3}\right).$$

13. The method as recited in claim 12, wherein the value $\eta$ is approximated with a leaky integrator.

14. The method as recited in claim 12, wherein the value $\eta$ is generally set to a predefined value.

15. The method as recited in claim 1, wherein the cost criterion is a mean squared error (MSE) cost criterion of the form:

$$J_{mse}^{(dc)}(h,\hat{p})=E\{|y(n)-\hat{p}-a(n-d)|^2\}$$

where h represents the equalizer function, $\hat{p}$ is the estimate of the offset, d is a delay, a(n) is the source symbol, and y(n) is the current sample.

16. The method as recited in claim 1, wherein an optimization of the cost criterion generates a set of filter parameters for an equalizer.

17. The method as recited in claim 16, further comprising the step of applying, by the equalizer, the equalizer function to the one or more current samples, and wherein step (c) comprises the steps of subtracting the estimate of the offset from the equalized current samples.

18. The method as recited in claim 17, wherein the equalizer is a decision feedback equalizer having a forward filter and a feedback filter, and the method further comprises the step of adding the estimate of the offset to the signal applied to the feedback filter.

19. The method as recited i claim 1, wherein the received signal is a carrier modulated by data in accordance with a vestigial sideband (VSB) format.

20. The method as recited in claim 1, wherein the signal is a digital television signal having it data encoded in accordance with an ATSC standard.

21. The method as recited in claim 1, wherein the level offset is a DC level offset in the received signal, wherein the DC level offset corresponds to a pilot signal.

22. The method as recited in claim 3, wherein the equalizer performs blind equation in which the equalizer function is derived from the received signal without using a training sequence.

23. Apparatus for estimating a level offset in a received signal, the apparatus comprising:

a tap update generator adapted to update an equalizer function based on a joint minimization of a cost criterion with respect to a channel response and the offset; and a pilot removal generator adapted to:
1) generate an estimate of the offset from one or more current samples of the received signal based on an error term derived from the joint minimization of a cost criterion;
2) adjusting the estimate of the offset based on one or more subsequent samples of the received signal in accordance with the joint minimization.

24. The apparatus as recited in claim 23, further comprising a circuit adapted to apply the adjusted estimate of the offset to the received signal.

25. The apparatus as recited in claim 24, wherein the circuit comprises an equalizer filter applying the equalizer function to a received signal, wherein the equalizer function accounts for the adjusted estimate of the offset.

26. The apparatus as recited in claim 25, wherein the equalizer is a decision feedback equalizer having a forward filter and a feedback filter, wherein the estimate of the offset is added to the signal applied to the feedback filter.

27. The apparatus as recited in claim 23, wherein the pilot removal generator is adapted to generate an initial estimate of the offset.

28. The apparatus as recited in claim 27, wherein the initial estimate is set as the value for the offset applied to the signal prior to transmission to a receiver of the received signal.

29. The apparatus as recited in claim 27, wherein the initial estimate $\hat{p}$ is set as an average over one or more samples.

30. The apparatus as recited in claim 29, wherein the average at time t+1 over one or more samples represents a mean of the received signal that is approximated by a leaky integrator of the form:

$$\hat{p}_{t+1}=(1-\alpha)\hat{p}_t+\alpha y_n,$$

where $y_n$ is the current sample and $\alpha$ is the step size.

31. The apparatus as recited in claim 23, wherein the pilot removal generator adjusts the estimate based on a recursive algorithm.

32. The apparatus as recited in claim 23, wherein the cost criterion subject to joint minimization is selected from a Bussgang class of cost functions.

33. The apparatus as recited in claim 23, wherein the cost criterion is a constant modulus (CM) cost criterion of the form:

$$J_{CM}^{(dc)}(f,\hat{p})=E\{(|y_n(f)-\hat{p}|^2-\gamma)^2\},$$

where f represents the channel function, $\hat{p}$ is the estimate of the offset, $\gamma$ is the dispersion coefficient, and $y_n$ is the current sample.

34. The apparatus as recited in claim 23, wherein the cost criterion is a single axis constant modulus (SA-CM) cost criterion of the form:

$$J_{SA-CM}^{(dc)}(f,\hat{p})=E\{(Re(y_n(f)-\hat{p})^2-\gamma)^2\},$$

where f represents the channel function, $\hat{p}$ is the estimate of the offset, $\gamma$ is the dispersion coefficient, and $y_n$ is the current sample.

35. The apparatus as recited in claim 34, wherein the recursive algorithm is a gradient optimization algorithm of the form:

$$\hat{p}_{t+1}=\hat{p}_t+\eta\mu\epsilon_y,$$

where $y_n$ is the received sample, $$\epsilon_y = ((y_n - \hat{p}_t)^2 - \gamma)(y_n - \hat{p}_t)$$

and $\eta = -\text{sign}$ $$\left( E\{z^2\} - \frac{\gamma}{3} \right).$$

36. The apparatus as recited in claim 35, wherein the value $\eta$ is approximated with a leaky integrator.

37. The apparatus as recited in claim 35, wherein the value $\eta$ is generally set to a predefined value.

38. The apparatus as recited in claim 23, wherein the cost criterion is a mean squared error (MSE) cost criterion of the form:

$$J_{mse}^{(dc)}(h, \hat{p}) = E\{|y(n) - \hat{p} - a(n-d)|^2\}$$

where h represents the equalizer function, $\hat{p}$ is the estimate of the offset, d is a delay, a(n) is a source symbol and y(n) is the current sample.

39. The apparatus as recited in claim 23, wherein the signal is a carrier modulated by data in accordance with a vestigial sideband (VSB) format.

40. The apparatus as recited in claim 23, wherein the signal is a digital television signal having its data encoded in accordance with an ATSC standard.

41. The apparatus as recited in claim 23, wherein the level offset is a DC level offset in the received signal, wherein the DC level offset corresponds to a pilot signal.

42. The apparatus as recited in claim 25, wherein the equalizer performs blind equalization in which the equalizer function is derived from the received signal without using a training sequence.

43. A computer-readable medium having stored thereon a plurality of instructions, the plurality of instructions including instructions which, when executed by a processor, cause the processor to implement a method for estimating a level offset in a received signal, the method comprising the steps of:
(a) updating an equalizer function based on a joint minimization of a cost criterion with respect to a channel response and the offset;
(b) generating an estimate of the offset from one or more current samples of the received signal based on an error term derived from the joint minimization; and
(c) adjusting the estimate of the offset based on one or more subsequent samples of the received signal in accordance with the joint minimization.

44. The computer-readable medium as recited in claim 43, further comprising the step of:
(d) subtracting the adjusted estimate of the offset from the received signal.

45. The computer-readable medium as recited in claim 44, wherein step (d) comprises the steps of:
(d1) generating, for an equalizer, an equalizer function accounting for the adjusted estimate of the offset;
(d2) applying the equalizer function to the received signal.

46. A method of estimating a level offset in a received signal, comprising the steps of:
(a) generating an initial estimate of the offset, wherein: the initial estimate $\hat{p}$ is set as an average over one or more samples; and
the average at time t+1 over one or more samples represents a mean of the received signal that is approximated by a leaky integrator of the form:

$$\hat{p}_{t+1} = (1-\alpha)\hat{p}_t + \alpha y_n,$$

where $y_n$ is the current sample and $\alpha$ is the step size;
(b) generating an estimate of the offset from one or more current samples of the received signal based on a joint minimization of a cost criterion with respect to a channel response and the offset; and
(c) adjusting the estimate of the offset based on one or more subsequent samples of the received signal in accordance with the joint minimization.

47. A method of estimating a level offset in a received signal, comprising the steps of:
(a) generating an estimate of the offset from one or more current samples of the received signal based on a joint minimization of a cost criterion with respect to a channel response and the offset, wherein the cost criterion subject to joint minimization is selected from a Bussgang class of cost functions; and
(b) adjusting the estimate of the offset based on one or more subsequent samples of the received signal in accordance with the joint minimization.

48. A method of estimating a level offset in a received signal, comprising the steps of:
(a) generating an estimate of the offset from one or more current samples of the received signal based on a joint minimization of a cost criterion with respect to a channel response and the offset, wherein the cost criterion subject to joint minimization is a constant modulus (CM) cost criterion of the form:

$$J_{CM}^{(dc)}(f, \hat{p}) = E\{(|y_n(f) - \hat{p}|^2 - \gamma)^2\},$$

where f represents the channel function, $\hat{p}$ is the estimate of the offset, $\gamma$ is the dispersion coefficient, and $y_n$ is the current sample; and
(b) adjusting the estimate of the offset based on one or more subsequent samples of the received signal in accordance with the joint minimization.

49. A method of estimating a level offset in a received signal, comprising the steps of:
(a) generating an estimate of the offset from one or more current samples of the received signal based on a joint minimization of a cost criterion with respect to a channel response and the offset, wherein the cost criterion is a single axis constant modulus (SA-CM) cost criterion of the form:

$$J_{SA-CM}^{(dc)}(f, \hat{p}) = E\{(Re(y_n(f) - \hat{p})^2 - \gamma)^2\}$$

where f represents the channel function, $\hat{p}$ is the estimate of the offset, $\gamma$ is the dispersion coefficient, and $y_n$ is the current sample; and
(b) adjusting the estimate of the offset based on one or more subsequent samples of the received signal in accordance with the joint minimization.

50. The method as recited in claim 49, wherein the recursive algorithm is a gradient optimization algorithm of the form:

$$\hat{p}_{t+1} = \hat{p}_t + \eta \mu \epsilon_y,$$

where $y_n$ is the received sample, $$\epsilon_y = ((y_n - \hat{p})^2 - \gamma)(y_n - \hat{p}_t)$$

and $\eta = -\text{sign}$ $$\left(E\{z^2\} - \frac{\gamma}{3}\right).$$

51. The method as recited in claim 50, wherein the value $\eta$ is approximated with a leaky integrator.

52. The method as recited in claim 50, wherein the value $\eta$ is generally set to a predefined value.

53. A method of estimating a level offset in a received signal, comprising the steps of:

(a) generating an estimate of the offset from one or more current samples of the received signal based on a joint minimization of a cost criterion with respect to a channel response and the offset, wherein the cost criterion is a mean squared error (MSE) cost criterion of the form:

$$J_{mse}^{(dc)}(h,\hat{p}) = E\{|y(n)-\hat{p}-a(n-d)|^2\}$$

where h represents the equalizer function, $\hat{p}$ is the estimate of the offset, d is a delay, a(n) is the source symbol, and y(n) is the current sample; and (b) adjusting the estimate of the offset based on one or more subsequent samples of the received signal in accordance with the joint minimization.

* * * * *

UNITED STATES PATENT AND TRADEMARK OFFICE
CERTIFICATE OF CORRECTION

PATENT NO. : 7,349,469 B1
APPLICATION NO. : 10/213854
DATED : March 25, 2008
INVENTOR(S) : Azzedine Touzni et al.

It is certified that error appears in the above-identified patent and that said Letters Patent is hereby corrected as shown below:

In the Detailed Description, Column 7, on lines 11 and 12, replace "September 1995." with --Doc. A/53, Sept. 1995.--.

Column 7, on line 35, replace "a distortion" with --distortion--.

Column 10, on line 9, replace "described" with --describes--.

Column 10, on line 20, replace "(4)" with --(4))--.

Column 10, on line 23, replace " $J_{SA-CM}(f,0) = E\{(\underline{h}^t\underline{a}_n + f\underline{w}_n)^2 - y)^2\}$ " with -- $J_{SA-CM}(f,0) = E\{((\underline{h}^t\underline{a}_n + f\underline{w}_n)^2 - y)^2\}$ --.

In the Detailed Description, Column 10, on line 37, replace "The minima $\hat{p}$ " with --The minima $\hat{p}_*$ --.

Column 15, on line 62, replace "these" with --those--.

Column 17, on line 52, replace "i" with --in--.

Column 17, on line 56, replace "it" with --its--.

UNITED STATES PATENT AND TRADEMARK OFFICE
CERTIFICATE OF CORRECTION

PATENT NO. : 7,349,469 B1
APPLICATION NO. : 10/213854
DATED : March 25, 2008
INVENTOR(S) : Azzedine Touzni et al.

It is certified that error appears in the above-identified patent and that said Letters Patent is hereby corrected as shown below:

Column 20, on line 66, replace " $\epsilon_y = ((y_n - \hat{p})^2 - \gamma)(y_n - \hat{p}_i)$ " with -- $\varepsilon_y = ((y_n - \hat{p}_t)^2 - \gamma)(y_n - \hat{p}_t)$ --.

Signed and Sealed this

Twenty-first Day of April, 2009

JOHN DOLL
*Acting Director of the United States Patent and Trademark Office*